United States Patent [19]

Sherlaw

[11] 4,223,430
[45] Sep. 23, 1980

[54] METHOD FOR MAKING SEAT ASSEMBLY FOR BUTTERFLY VALVES

[75] Inventor: Michael Sherlaw, Dollard-des-Ormeaux, Canada

[73] Assignee: Crane Co., New York, N.Y.

[21] Appl. No.: 965,540

[22] Filed: Dec. 1, 1978

[51] Int. Cl.³ .......................... B23P 15/00; B29C 6/00
[52] U.S. Cl. ............................. 29/157.1 R; 264/248; 264/263; 264/275; 251/306
[58] Field of Search ............ 29/157.1 R, 527.1, 527.2; 251/306; 264/248, 263, 275

[56] References Cited

U.S. PATENT DOCUMENTS

| | | | |
|---|---|---|---|
| 1,149,702 | 8/1915 | Vail | 113/116 UT |
| 1,271,070 | 7/1918 | Palecheck | 113/116 UT |
| 3,490,122 | 1/1970 | Hunder et al. | 29/527.1 |
| 3,567,180 | 3/1971 | Williams | 29/157.1 |
| 3,675,888 | 7/1972 | Scaramucci | 251/306 |
| 3,940,108 | 2/1976 | Edwards | 251/306 |

Primary Examiner—Daniel C. Crane
Attorney, Agent, or Firm—George S. Schwind

[57] ABSTRACT

A method of making an improved seat assembly for a butterfly valve. The seat assembly comprises a flexible, circular metal band embedded in a resilient material to form an annular seat assembly. The assembly is made by supporting the band in a fixed spatial position on movable finger members, positioning a mold about, but spaced from, the band, and molding the annular seat assembly in the mold to embed the band. The invention is also directed toward an improved seat assembly. In a preferred embodiment the circular band is made of two curved sections overlapping at the two joints and having diametrically opposite holes in the two overlapping areas.

7 Claims, 6 Drawing Figures

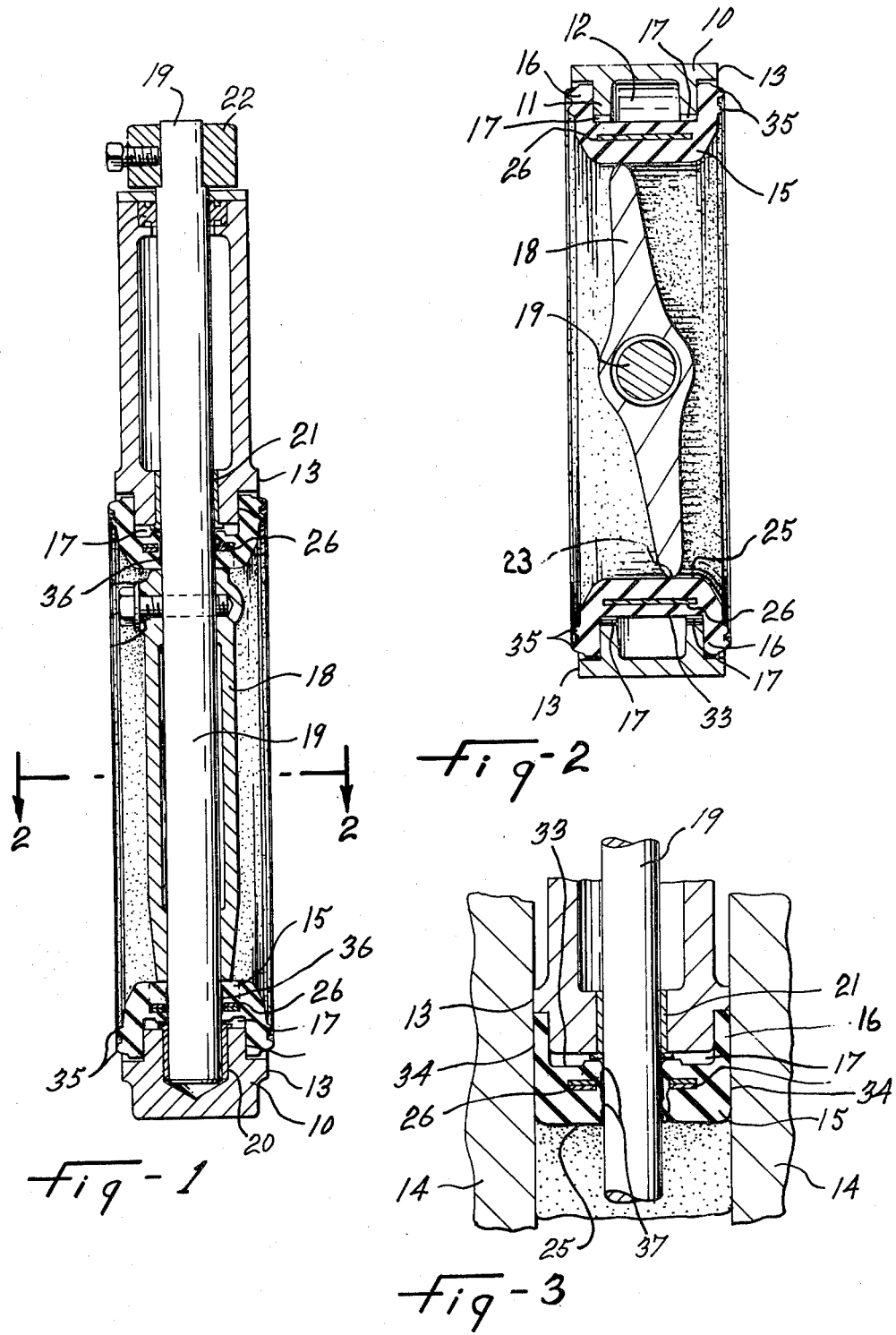

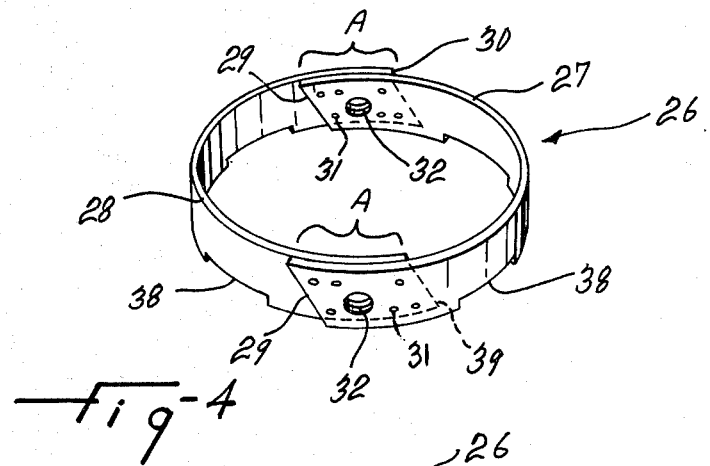
_fig_-4
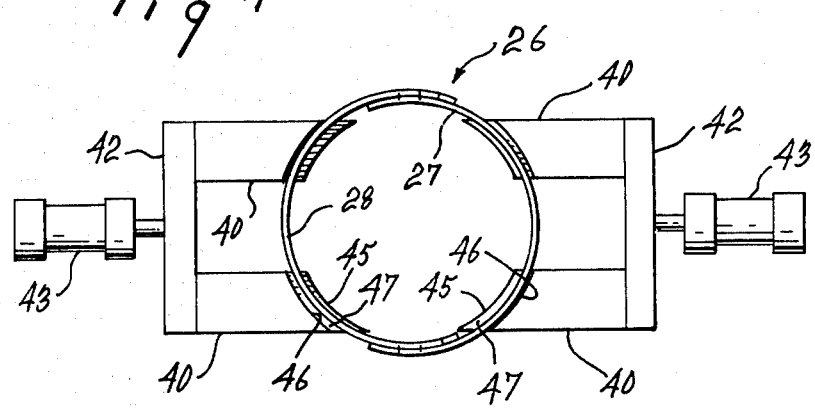
_fig_-5
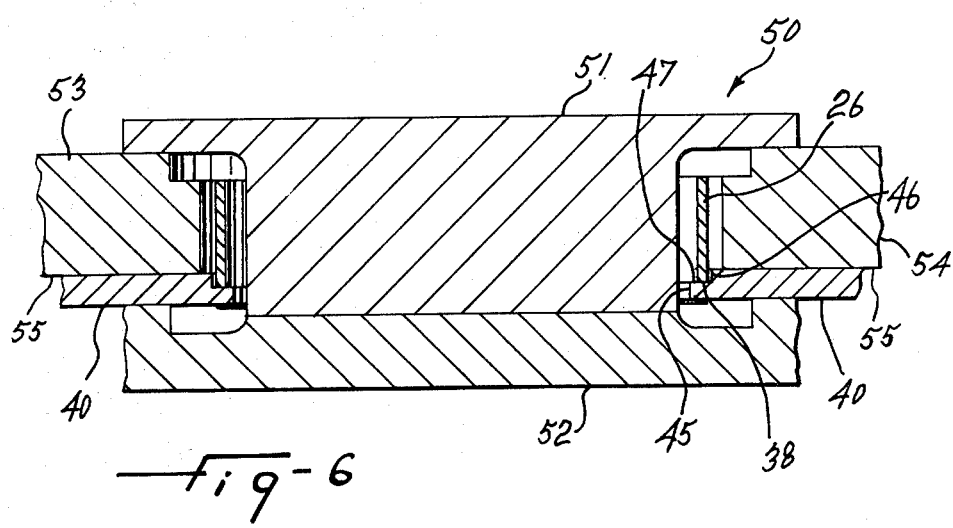
_fig_-6

METHOD FOR MAKING SEAT ASSEMBLY FOR BUTTERFLY VALVES

BACKGROUND AND SUMMARY OF THE INVENTION

This invention relates to a resilient seat for a butterfly valve, and more particularly to an improved method of manufacturing a resilient valve seat assembly having a flexible ring therein.

Typical resilient seats for butterfly valves are made of molded elastomeric material such as rubber. It has recently been found that an improved resilient seat is an annular seat of elastomeric material having a flexible circular band embedded therein. Such a seat assembly is disclosed in our co-pending application Ser. No. 276,542 filed Apr. 20, 1977. As described in this application, the resilient seat assembly is mounted in the body of a butterfly valve, and a circular disc is mounted within the seat assembly to seal the valve when the disc is closed.

Initially the resilient seat assembly was made by commencing with a continuous circular band or ring of flexible steel which had two holes diametrically opposed for a shaft to support the circular disc. Separate strips of material were added as stiffeners around the two holes to strengthen the band at these two areas. This construction required at least three separate pieces to be joined by welding or riveting in a somewhat complex jig.

Furthermore, when the circular band is assembled it has to be supported at the centre of a mold whilst the resilient material was inserted into the mold and allowed to harden to form the seat assembly. Supporting the band in the mold presents a number of problems, in one case the band shifted in the mold resulting in the seat assembly having the band eccentrically located and this affected the sealing of the disc on the seat. In another case, the resilient material was omitted from the outside surface of the band thus allowing the outside surface to be held in the mold during the forming step. However, it has been found that unless the band is completely embedded in the resilient material, separation occurs between the band and the material. Other methods using a mold with many parts is partially successful but the complexities of the mold and the time to assemble it cause expensive and time-consuming production.

It is, therefore, one purpose of the present invention to provide a simpler and less costly method of constructing a butterfly valve seat assembly. It is a further purpose of the present invention to provide an improved method of constructing a seat assembly with a flexible band properly embedded in resilient material.

It is another purpose of the present invention to provide an improved valve seat assembly.

In accordance with the present invention there is provided a method for making a seat assembly for a butterfly valve which comprises supporting a flexible, circular band in a fixed spatial position, positioning a mold about, but spaced from, the band while the band is supported, and molding an annular seat member from resilient material while the mold is positioned about the band to substantially embed the band within the seat member.

Furthermore, in a preferred embodiment the present invention provides the circular band being formed by overlapping the ends of two part circular, flexible band segments to form a circular band and joining the ends together.

The present invention is further directed toward a seat assembly for a butterfly valve comprising an annular, resilient seat member and a circular, flexible, band embedded with the annular seat member. The circular band comprises two, part circular segments the ends of which are overlapped and joined together.

The invention will now be described in detail having reference to the accompanying drawings in which,

BRIEF DESCRIPTION OF THE DRAWINGS

FIG. 1 is a cross sectional side view of a butterfly valve having a seat assembly according to one embodiment of the present invention.

FIG. 2 is a cross sectional plan view taken at line 2—2 of FIG. 1.

FIG. 3 is a partial cross sectional side view through a portion of the stem and disc of the valve shown in FIG. 1 positioned between two flanges.

FIG. 4 is a perspective view of the flexible band which is embedded in the seat assembly.

FIG. 5 is a plan view showing how the band is supported in a fixed spatial position.

FIG. 6 is a cross sectional view showing the mold positioned about the supported band.

DETAILED DESCRIPTION OF THE PREFERRED EMBODIMENT

Referring now to the drawings, the wafer type butterfly valve has a rigid annular body 10 as seen in FIGS. 1 and 2. The annular body has two internal ribs 11 as seen in FIG. 2. It will be apparent to those skilled in the art, that these two ribs 11 could be solid. These ribs 11 extend around the internal circumference of the body 10 and provide an annular space 12 between them. Opposing external parallel end surfaces 13 of the annular body 10 are adapted for clamping by opposing flanges 14 as shown in FIG. 3. A seat assembly 15 of generally annular shape is located within the annular body 10 The seat assembly has two external flanges 16, one at each side extending beyond the diameter of the seat assembly 15. The flanges 16 are gripped between the outside surface of the internal ribs 11 of the annular body 10 and the opposing mounting flanges 14 and leave a space 17 between the ends of the internal ribs 11 to allow some movement of the seat assembly 15 within the annular body 10.

A circular closure disc 18 is mounted within the seat assembly 15. The disc 18 is fixed to a shaft or stem 19 after mounting within the annular body 10. The stem 19 passes diametrically through the disc 18. One end of the stem 19 passes through the seat assembly 15 and is mounted in a socket 20 in the annular body 10. The other end of the stem 19 passes through the seat assembly 15 and a bore 21 in the annular body 10, and projects upwards connecting at the end to a handle 22. Rotation of the stem 19 by the handle 22 rotates disc 18 to open or close the valve. When the valve is closed, the outer edge 23 of disc 18 seats tightly on the inner cylindrical surface 25 of the seat assembly 15.

The seat assembly 15 comprises a flexible, circular band 26 embedded within annular resilient seat material. The flexible, circular band 26 preferably in accordance with the present invention, comprises two C-shaped circular segments 27 and 28 as shown in FIG. 4. Each of the two segments 27 and 28 extends over an angle of about 250°. The ends 29 and 30 of the segments 27 and 28 respectively are cut on the diagonal to distribute stress more gradually instead of providing a sudden change in section at the point of overlap. The ends 29 of segment 27 overlap the ends 30 of segment 28 and are joined together by suitable means such as by spotwelds 31. A pair of diametrically opposed holes 32 are provided in band 26 in the overlapped areas "A" of the band. As may be seen in FIG. 1, the stem 19 passes through these holes which are somewhat larger in size tha: the stem.

The annular seat assembly 15 has an outer cylindrical surface 33 concentric with the inner cylindrical surface 25 and side surfaces 34 extending from the inner cylindrical surface 25 along the outside of the external flanges 16. A section through the seat assembly 15 defines a U-shaped channel.

Each side surface 33 of the seat assembly 15 can also have a pair of raised, circular ridges 35 for sealing the valve between the mounting flanges 14. The annular seat assembly 15 also has a pair of diametrically opposed cylindrical holes 36 aligned with the holes 32 on the embedded band 26. The holes 36 are approximately the same size as the stem 19 which passes snugly therethrough. Circular ribs 37 can be provided on the inside surface of the holes 36 to seat against stem 19. It will be noted that the inside edges of the holes 32 in the band 26 are covered with a thin layer of the resilient material of the seat assembly 15.

The flexible circular band 26 is made of material which can deform under uneven stresses but return to its original shape when the stresses are released. A suitable material would be steel particularly stainless steel. The material from which the seat material is formed is preferably rubber, or another suitable thermoplastic material.

The band 26 is preferably provided with means by which it can be supported during manufacture of the seat assembly. These support means can comprise notches 38 in one edge 39 of the band as shown in FIG. 4. Preferably four notches 38 are provided, two in each segment 27, 28 The diagonally opposite notches in the segments are preferably diametrically opposed.

The notches 38 receive finger-like ring locating support members 40 which support the circular band 26 in a fixed, spatial position during manufacture of the seat assembly as shown in FIGS. 5 and 6. A first pair of support members 40 and a second pair of support members 40 are mounted for reciprocal movement toward and away from each other. Each pair of support members 40 can be mounted on a common support 42 which is moved by hydraulic means 43 or other suitable moving means. Each support member 40 has an arcuate leading edge 45 with the same curvature as the band 26. The support member 40 is stepped down adjacent the leading edge 45 providing a shoulder 46 having the same curvature as the leading edge. The stepped surface 47, between shoulder 46 and leading edge 45 supports the band 26 as will be described.

A mold 50 as shown in FIG. 6 is provided for molding the seat assembly 15. The mold 50 includes a two part inner mold 51, 52 and a two part outer mold 53, 54. The outer molds 53, 54 and semi-circular in shape and move together to define the surfaces of the circular in shape and move together to define the surfaces of the circular U-shaped cross section of the annular seat assembly 15. The outer molds, 53, 54 have notches 55 through which the support members 40 pass. Suitable means (not shown) move the molds 53, 54 together. The inner mold parts 51, 52 define the outer surfaces 34 of the external flanges 16 and the cylindrical inner surface 25 of the seat assembly 15. Suitable means (not shown) are provided for moving the inner mold parts 51, 52 together, and against outer mold parts 53, 54 to define a cavity defining the shape of annular seat assembly 15.

To manufacture the seat assembly 15 the band 26 is first supported by finger-like support members 40. The opposed support members 40 are moved toward each other with the leading edge 45 of the members 40 passing into the notches 38 in band 26 and with the curved shoulder 46 on each member 40 moving against the curved outer surface of the band 26. The members 40 grip and hold the band 26 horizontally is a fixed spatial position. The outer molds 53, 54 are then moved together, surrounding the held band 26 but spaced slightly therefrom. The notches 55 in the molds 53, 54 receive the members 40 as the molds 53, 54 are moved together. Now the inner molds 51, 52 are moved together and abut the outer molds defining an annular cavity surrounding but spaced from band 26. The band 26 is centrally located within the cavity and firmly gripped by members 40. Resilient molding material is then introduced into the cavity through one or more inlets (not shown) in the mold by suitable injections means (not shown). The resilient molding material flows about the band 26 embedding it to form the resilient annular seat assembly 15.

The mold sections 51, 52, 53, 54 are then withdrawn as are the members 40 leaving a completed seat assembly 15. The seat assembly 15 can be manufactured in the above manner using any form of flexible band 26. It is preferred, however, to use the novel two-part band described.

I claim:

1. A method of making a resilient valve seat assembly having a flexible ring therein for a butterfly valve comprising, providing two substantially C-shaped circular band segments each having circumferential ends with the ends of each segment having holes therein forming a flexible circular band by overlapping the ends of the two part circular band segments with the holes in alignment and joining the overlapped ends together, therein supporting the circular band in a fixed spatial position, positioning a mold about but spaced from the band while the band is supported, and molding an annular seat member from resilient material while the mold is positioned about the band to substantially embed the band within the seat member.

2. The method as claimed in claim 1 wherein the band is supported by opposed support members, the support members moved toward each other, in a direction substantially perpendicular to the outer face of the band, to support the band between them.

3. The method as claimed in claim 2 wherein the support members hold the circular band in a horizontal plane and prevent it from moving horizontally.

4. The method as claimed in claim 3 wherein one portion of the support members are moved into notches formed in the bottom edge of the band, and another portion of the support members are moved against the outer face of the band.

5. The method as claimed in claim 2 wherein the mold comprising at least two movable mating parts is also positioned about opposed support members when they support the band.

6. The methods as claimed in claim 1 wherein the overlapped ends are spot-welded together.

7. The method as claimed in claim 1 wherein the hole in each of the ends being of the same size, and the band is assembled by inserting the holes of the ends of the two part segments over a circular rod to form two overlapped ends.

* * * * *